(12) United States Patent
Gala et al.

(10) Patent No.: US 10,509,638 B1
(45) Date of Patent: Dec. 17, 2019

(54) METHOD AND SYSTEM FOR DEPLOYING THIRD PARTY DEVICE SERVICES THROUGH AN ENCLOSED APPLIANCE INTERFACE USING CONTAINERS

(71) Applicant: EMC IP Holding Company LLC, Hopkinton, MA (US)

(72) Inventors: Kaushal Shailesh Gala, Round Rock, TX (US); Rakesh Kumar Ayolasomyajula, Georgetown, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/880,813

(22) Filed: Jan. 26, 2018

(51) Int. Cl.
G06F 8/61 (2018.01)
G06F 9/54 (2006.01)
G06F 21/53 (2013.01)

(52) U.S. Cl.
CPC .......... *G06F 8/63* (2013.01); *G06F 9/547* (2013.01); *G06F 21/53* (2013.01); *G06F 2221/2115* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 8,200,823 | B1* | 6/2012 | Zhang | H04L 41/5041 709/223 |
| 9,176,720 | B1* | 11/2015 | Day-Richter | G06F 8/63 |
| 2005/0262477 | A1* | 11/2005 | Kovachka-Dimitrova | G06F 8/65 717/118 |
| 2009/0323941 | A1* | 12/2009 | Sahita | G06F 21/53 380/44 |
| 2016/0182315 | A1* | 6/2016 | Salokanto | H04L 41/5054 709/226 |
| 2016/0267150 | A1* | 9/2016 | Gubau i Forne | G06Q 30/018 |
| 2017/0093700 | A1* | 3/2017 | Gilley | H04L 45/44 |
| 2017/0093923 | A1* | 3/2017 | Duan | H04L 63/1408 |
| 2017/0364342 | A1* | 12/2017 | Shuster | G06F 8/61 |
| 2018/0121485 | A1* | 5/2018 | Jayanthi | G06F 8/63 |
| 2018/0248915 | A1* | 8/2018 | Beckman | G06F 21/62 |
| 2018/0285250 | A1* | 10/2018 | Helsley | G06F 11/3692 |
| 2018/0349033 | A1* | 12/2018 | Kapadia | H04L 51/12 |
| 2019/0230130 | A1* | 7/2019 | Beckman | H04L 63/20 |

* cited by examiner

*Primary Examiner* — Wei Y Zhen
*Assistant Examiner* — Binh Luu
(74) *Attorney, Agent, or Firm* — Chamberlain, Hrdlicka, White, Williams & Aughtry

(57) ABSTRACT

A method and system for deploying third party device services through an enclosed appliance interface using containers. Specifically, the disclosed method and system entail employing a generic plugin to facilitate the integration and execution of custom, third-party plugins onto the framework of a platform. The custom, third-party plugins, via the generic plugin, perform hardware device operations as secured and sandboxed computer processes (i.e., containers), which are stateless, and thus, fail to cause idling across computer processor and memory usage.

18 Claims, 12 Drawing Sheets

```
"name": "custom-storage-plugin", "version" : "1.0",
"deviceType" : 12345,
"apiSchemaType" : "openApi", "basePath": "/api",
"consumes": ["application/json"], "produces": ["application/json"],
"definitions" : {
    "Token" : { "type": "object",
            "required": ["id"],
            "properties": { "id": { "type": "string" } }
    },
    "StorageDevice" : { "type": "object",
            "properties": {
                    "serialNumber": { "type": "string" },
                    "storagePort": { "type": "string" },
                    "healthState": { "type": "string" }
            }
    }
},
```

*FIG. 8A*

```
"authorization": {
  "connect": {
    "url": "/login",
    "method": "POST",
    "parameters": [
      { "name": "Authorization", "in": "header", "required": true, "type": "string" }
    ],
    "responses": {
      "200": { "schema": { "$ref": "#/definitions/Token" } },
      "default": { "schema": { "$ref": "#/definitions/Error" } }
    }
  },
  "disconnect": { "url": "/logout", "method": "POST", ... },
}
```

FIG. 8B

```
"operations" : {
  "discover" : [{
    "uri" : "/storageDevices", "method" : "POST",
    "parameters" : [
      {"name" : "deviceData", "in" : "body", "required" : true, "type" : "#/definitions/StorageDevice"}
    ],
    "responses" : {...}
  }, ...
  ],
  "query" : [{"uri" : "/storagePorts", ...}, {"uri" : "/luns", ...}, {"uri" : "/datastores"}, ...],
  "config" : [{"uri" : "/createZones", "method" : "POST", ...}, {"uri" : "/createLun", ...}, ...]
}
```

METHOD AND SYSTEM FOR DEPLOYING THIRD PARTY DEVICE SERVICES THROUGH AN ENCLOSED APPLIANCE INTERFACE USING CONTAINERS

BACKGROUND

Custom tools and/or services, developed by third-parties, that pertain to hardware device operations on a platform are often realized using different technology stacks, programming languages, libraries, and other resources. These differences, expressly highlighting the lack of uniformity used in the development of these tools and/or services, hamper the seamless integration of these tools and/or services into the basic framework of the platform.

BRIEF DESCRIPTION OF DRAWINGS

FIG. 8A shows example container registration information in accordance with one or more embodiments of the invention.

FIG. 8B shows example device authorization information in accordance with one or more embodiments of the invention.

FIG. 8C shows example device operations information in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for deploying third party device services through an enclosed appliance interface using containers. Specifically, one or more embodiments of the invention entail employing a generic plugin to facilitate the integration and execution of custom, third-party plugins onto the framework of a platform. The custom, third-party plugins, via the generic plugin, perform hardware device operations as secured and sandboxed computer processes (i.e., containers), which are stateless, and thus, fail to cause idling across computer processor and memory usage.

Figure 1:
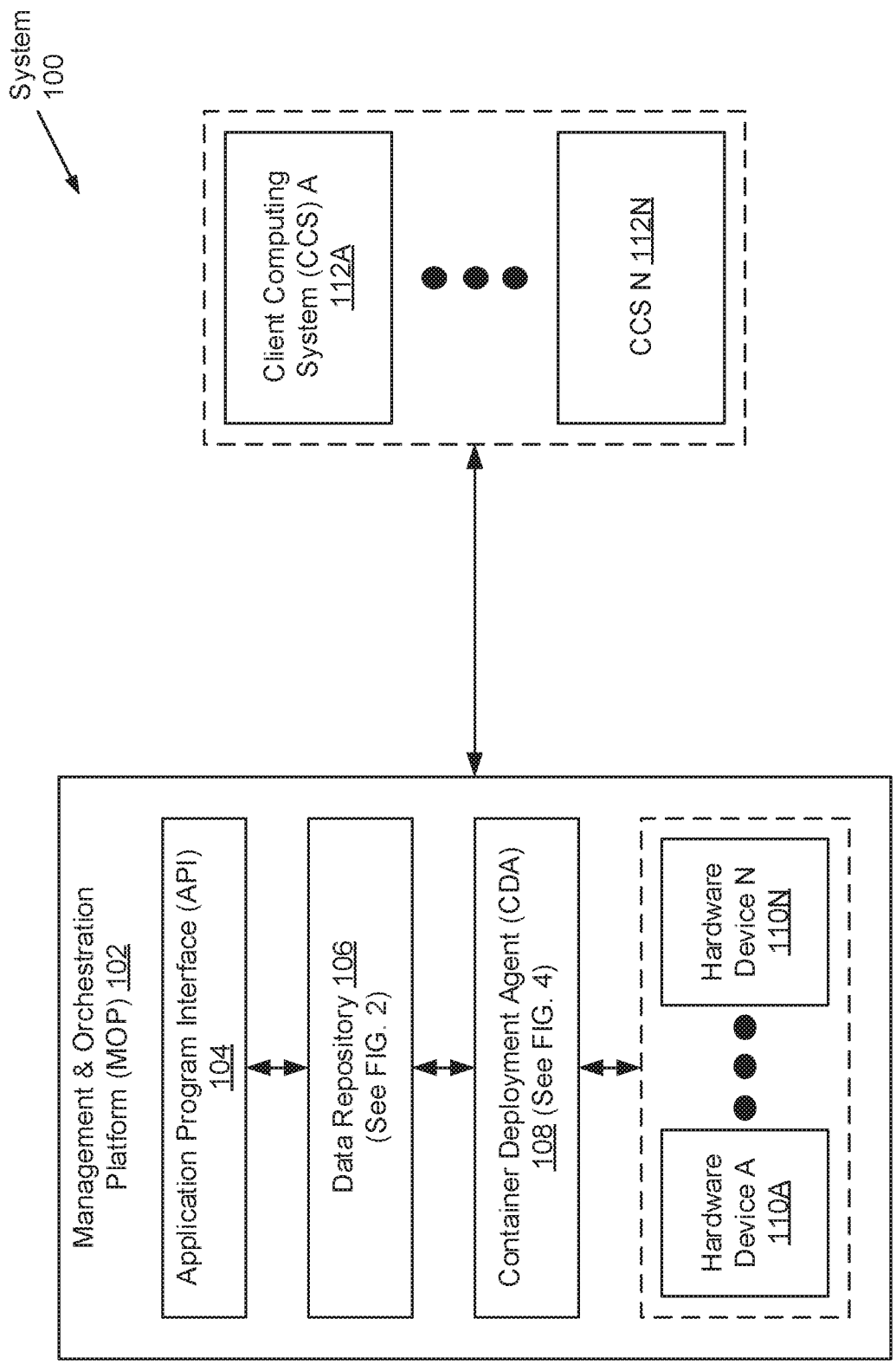
FIG. 1 shows a system in accordance with one or more embodiments of the invention.

FIG. 1 shows a system in accordance with one or more embodiments of the invention. The system (100) includes a management and orchestration platform (MOP) (102) operatively connected to one or more client computing systems (CCSs) (112A-112N). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the MOP (102) may be a systems management service for standardizing systems management functionality and interfacing in a single, unified architecture. Further, the MOP (102) may provide services pertaining to the automation of lifecycle management operations (e.g., deployment, configuration, updates, monitoring, and maintenance) for hardware infrastructure (i.e., one or more hardware devices (110A-110N)). More specifically, the MOP (102) may include functionality to: service user and management application (not shown) requests; request and parse responses for resource management functions; and create and terminate sessions with managed hardware devices (110A-110N).

In one embodiment of the invention, the MOP (102) may be implemented on one or more servers (not shown). Each server may be a physical server (i.e., in a datacenter) or a virtual server (i.e., that may be cloud-based). In another embodiment of the invention, the MOP (102) may be implemented on one or more computing systems similar to the exemplary computing system shown in FIG. 7. Moreover, the MOP (102) may include an application program interface (API) (104), a data repository (106), a container deployment agent (CDA) (108), and one or more hardware devices (110A-110N). Each of these components is described below.

In one embodiment of the invention, the API (104) may be a hardware and/or software implemented construct that employs a set of subroutine definitions, protocols, and/or tools for structuring information exchange between the MOP (102) and one or more CSSs (112A-112N). For example, the API (104) may establish that the exchange of information may entail a request for processing, and a return of a response, if any, based on the outcome of the processing. In one embodiment of the invention, the API (104) may be a web API accessed through an assigned web address (e.g., a uniform resource locator (URL)) and a WAN (e.g., Internet) connection.

In one embodiment of the invention, the data repository (106) may be a storage system or medium for consolidating various forms of data. The data repository (106) may be implemented using any type of storage unit and/or device (e.g., a filesystem, a database, a collection of tables, or any other storage mechanism). Further, the data repository (106) may be implemented using multiple storage units and/or devices, which may or may not be of the same type or located at the same physical site. In one embodiment of the invention, the data repository (106) may be implemented using persistent (i.e., non-volatile) storage media. Examples of persistent storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). Furthermore, the data repository (106) may be configured to store various data pertinent to embodiments of the invention, which are described in further detail below with respect to FIG. 2.

In one embodiment of the invention, the CDA (108) may be a computer program, or a computer process (i.e., an instance of a computer program), executing on the underlying hardware of the MOP (102). Specifically, the CDA (108) may be a computer program or process tasked with the deployment and execution of third-party service containers onto the MOP (102) in accordance with embodiments of the invention (see e.g., FIGS. 5-6B). The aforementioned third-party service containers may be obtained from the one or more CCSs (112A-112N) and, additionally, may pertain to custom tools and/or services for discovering, operating, and/or managing one or more of the hardware devices (110A-110N). The CDA (108) is described in further detail below with respect to FIG. 4.

In one embodiment of the invention, a hardware device (110A-110N) may be a physical component managed by, residing on, or otherwise operatively connected to, the MOP (102). Specifically, a hardware device (110A-110N) may encompass any physical granularity of a computing system (see e.g., FIG. 7) or a collection of computing systems. For example, in one embodiment of the invention, a hardware device (110A-110N) may entail a physical component as fundamental as a sensor, an actuator, or a microchip. On the other hand, in another embodiment of the invention, a hardware device (110A-110N) may entail a physical system as complex as a set of inter-communicating servers (e.g., a mainframe), which may encompass a plethora of sensors, actuators, microchips, and other fundamental components. Furthermore, in one embodiment of the invention, a hardware device (110A-110N) may be any physical component that provides any functionality, to the MOP (102) and/or other systems, that may be mechanical, electronic, magnetic, optical, etc., or any combination thereof, in nature. Additional examples of a hardware device (110A-110N) may include, but are not limited to: motherboards, memory (e.g., random-access memory (RAM), read-only memory (ROM), etc.), storage devices (e.g., hard disk drives, flash memory drives, magnetic tape drives, etc.), network interface cards, video cards, audio cards, etc.

In returning to discussing the system (100), in one embodiment of the invention, a CCS (112A-112N) may be any computing system (see e.g., FIG. 7) from which a services installation package (SIP) (described below) originates. Regarding interaction with the MOP (102), a CCS (112A-112N) may include functionality to: (i) upload one or more SIPs to the MOP (102), where each SIP may pertain to at least one hardware device (110A-110N); (ii) submit one or more device operation requests (DORs) (described below) to the MOP (102), where each DOR may pertain to at least one hardware device (110A-110N); and (iii) receive one or more operation response sets (ORSs) (described below) from the MOP (102) and as a result of submitting one or more DORs. One of ordinary skill will appreciate that a CCS (112A-112N) may include further functionalities without departing from the scope of the invention. Examples of a CCS (112A-112N) include, but are not limited to including, one or more: desktop computers, laptop computers, smartphones, tablet computers, gaming consoles, servers, mainframes, virtual machines, or any combination thereof.

While FIG. 1 shows a configuration of components, other system configurations may be used without departing from the scope of the invention. For example, the system (100) may further include one or more additional hardware devices (110A-110N) that reside external, yet still operatively connected, to the MOP (102).

Figure 2:
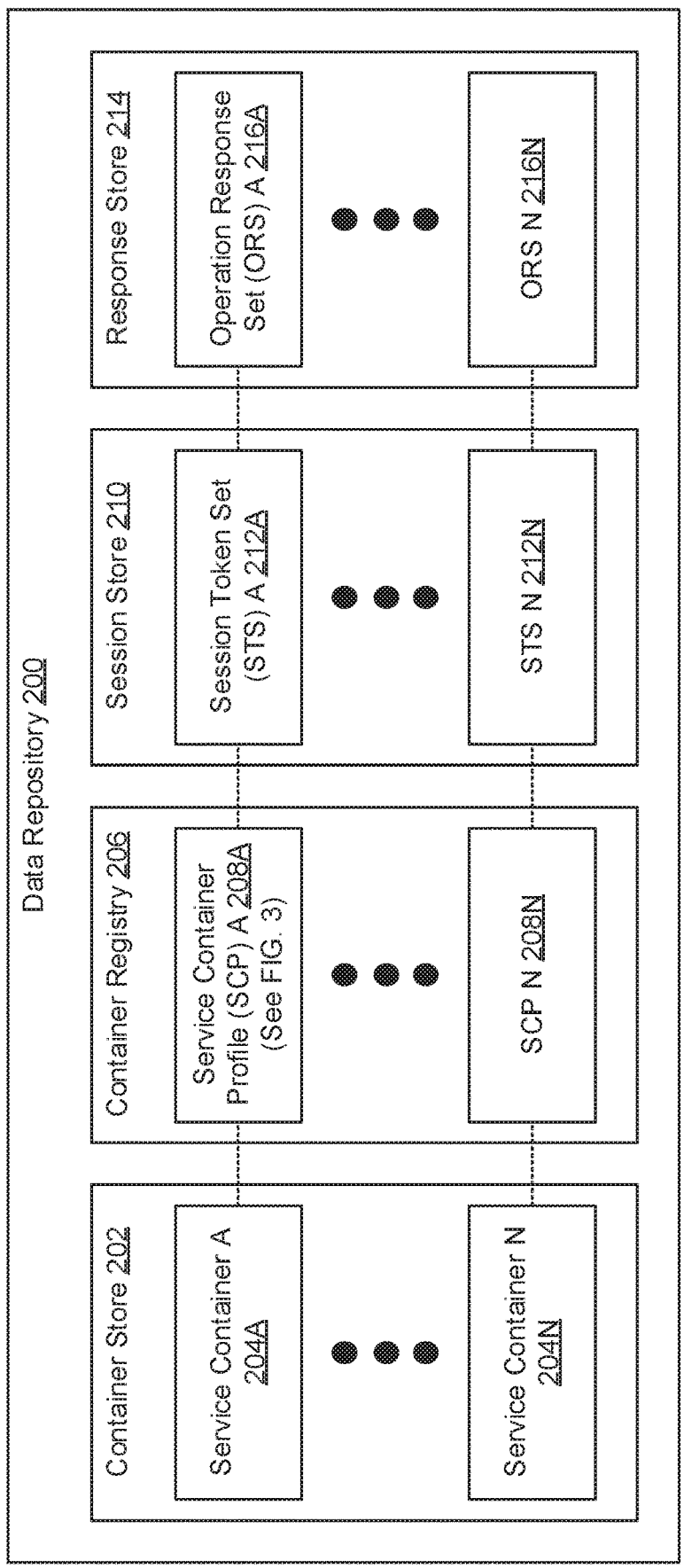
FIG. 2 shows a data repository in accordance with one or more embodiments of the invention.

FIG. 2 shows a data repository in accordance with one or more embodiments of the invention. As described above, the data repository (200) may be one or more storage systems or media, residing on the MOP (see e.g., FIG. 1), for consolidating various forms of data. Further, in one embodiment of the invention, the data repository (200) may be physically or logically segmented into various stores for consolidating different data. Subsequently, the data repository (200) may include, but is not limited to including: a container store (202), a container registry (206), a session store (210), and a response store (214). Each of these components is described below.

In one embodiment of the invention, the container store (202) may be a dedicated storage space in the data repository (200) for the consolidation of one or more service containers (204A-204N). A service container (204A-204N) may be an isolated, lightweight virtualization mechanism (or software construct) that allows for the execution of a custom, third-party tool and/or service within the service container (204A-204N) without the overhead of executing a hypervisor (as is needed for executing virtual machines on underlying hardware). Minimal overhead may be generated by a service container (204A-204N) because: (i) in general, containers share the same operating system kernel with other containers and the underlying host (e.g., the MOP); and (ii) in general, containers (unlike virtual machines) do not need to emulate physical hardware. Further, in one embodiment of the invention, the above-mentioned custom, third-party tool and/or service that may execute within a service container (204A-204N) may be a custom, third-party plugin directed towards enhancing the standard behavior or functionality of a hardware device (see e.g., FIG. 1).

In one embodiment of the invention, the container registry (206) may be a dedicated storage space in the data repository (200) for the consolidation of one or more service container profiles (SCPs) (208A-208N). A SCP (208A-208N) may be a collection of information pertaining to a service container (204A-204N). More specifically, a SCP (208A-208N) may disclose information pertinent for: registering the respective service container (204A-204N) onto the MOP, accessing a hardware device, and performing one or more device operations respective to the hardware device. Further, a SCP (208A-208N) may be represented through, for example, a data structure, a table, a text file, or any other data encoding format. SCPs (208A-208N) are described in further detail below with respect to FIG. 3.

In one embodiment of the invention, the session store (210) may be a dedicated storage space in the data repository (200) for the consolidation of one or more session token sets (STSs) (212A-212N). A STS (212A-212N) may encompass one or more session tokens obtained through interfacing with, and the invocation of device operations (described below) specified in, a service container (204A-204N). In one embodiment of the invention, each session token may be obtained as a result of establishing an application programming interface (API) session. An API session may be an interactive information interchange, established through an API, between two or more computer programs, computer processes, hardware devices, containers (e.g., service containers (204A-204N), etc.), virtual machines, or a combination thereof. Further, each session token may be a unique identifier that references a respective, established API session. By way of an example, a session token may take the form of a hash, which may be generated by way of a hashing function executed by the container deployment agent (CDA) (see e.g., FIG. 1).

In one embodiment of the invention, the response store (214) may be a dedicated storage space in the data repository (200) for the consolidation of one or more operation response sets (ORSs) (216A-216N). An ORS (216A-216N) may encompass one or more operation responses obtained as a result of executing one or more device operations, respectively, on a select hardware device (see e.g., FIG. 1). That is, in one embodiment of the invention, each operation response may be a result attained from the invocation of a device operation. Accordingly, a result may express the successful invocation (e.g., a success message) of a hardware device operation, or alternatively, may express the failure (e.g., an error message) of a device operation invocation. Additionally, an ORS (216A-216N) may be otherwise accessed using, for example, a user interface (UI) or a representational state transfer (REST)ful web API. A RESTful API may be an API that uses hypertext transfer protocol (HTTP) requests to communicate and/or present data (i.e., the one or more operation responses).

While FIG. 2 shows a configuration of components, one of ordinary skill will appreciate that the data repository (200) may consolidate additional or alternative data without departing from the scope of the invention.

Figure 3:
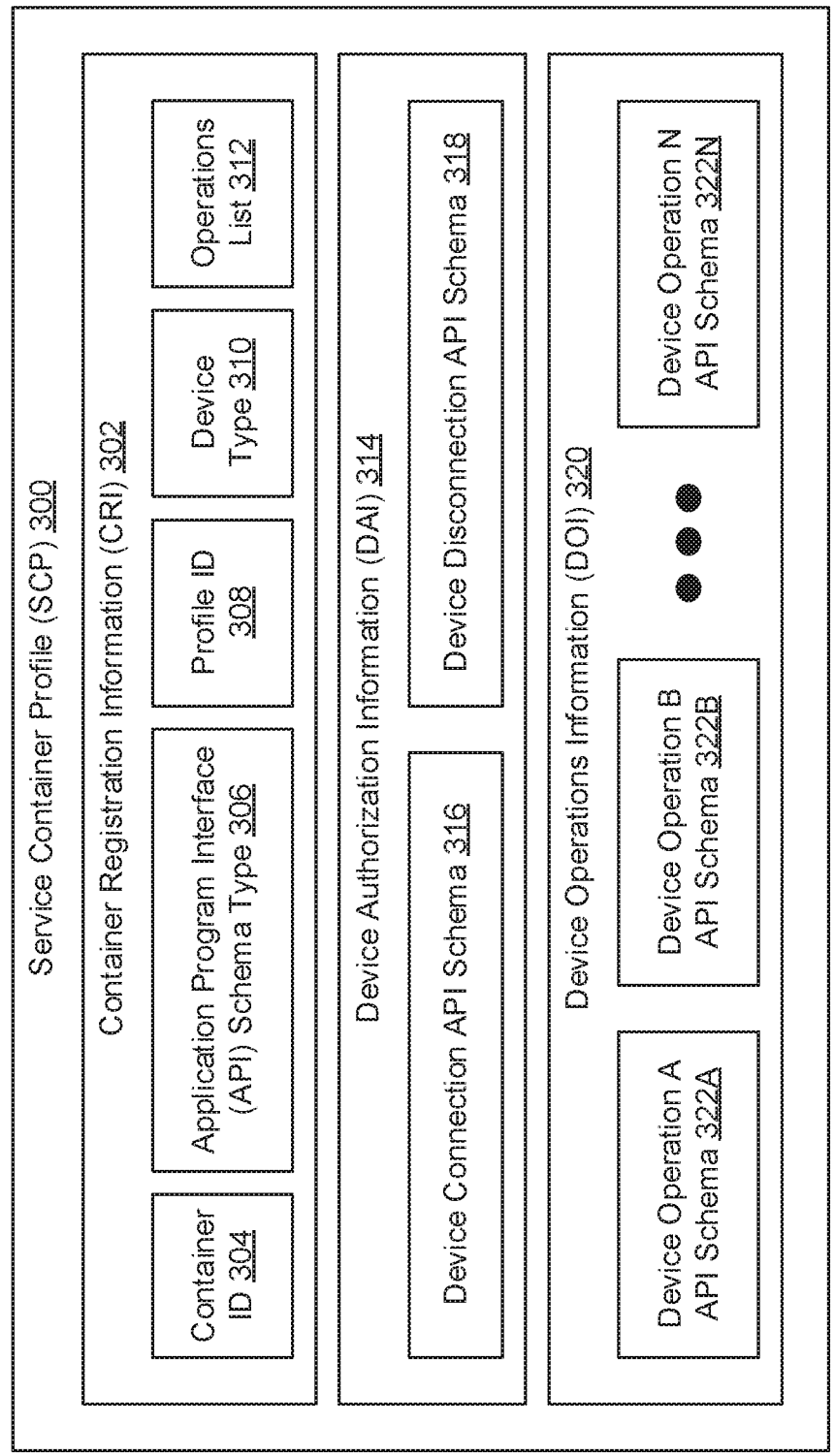
FIG. 3 shows a service container profile in accordance with one or more embodiments of the invention.

FIG. 3 shows a service container profile (SCP) in accordance with one or more embodiments of the invention. As described above, a SCP (300) may be a collection of information pertaining to a service container (see e.g., FIG. 2). The service container, in turn, may be affiliated with a hardware device. Substantively, a SCP (300) may include information including container registration information (CRI) (302), device authorization information (DAI) (314), and device operations information (DOI) (320). Each of these components is described below.

In one embodiment of the invention, CRI (302) may entail information pertinent to the registration process of the service container referenced by the SCP (300). Specifically, the registration of a service container may entail the process of integrating the service container (i.e., embodying a custom, third-party tool and/or service) with a generic container plugin (GCP) (described below) so that the service container may extend the standard behavior or functionality of the hardware device to which the service container may be directed. The CRI (302) may include, but may not be limited to including: a container identifier (ID) (304), an API schema type (306), a profile ID (308), a device type (310), and an operations list (312). Each of these pieces of information is described below.

In one embodiment of the invention, the container ID (304) may be a string of characters (e.g., letters, numbers, symbols, etc.) that may be used to uniquely identify the service container with which the SCP (300) is associated. The container ID (304) may be furnished alongside the service container when being uploaded onto the management and orchestration platform (MOP), or alternatively, the container ID (304) may be generated during or upon completion of the service container installation and/or registration process performed by the container deployment agent (CDA). By way of an example, the container ID (304) may be an alphanumeric tag, or may be a N-bit integer (where N>0) expressed in hexadecimal notation.

In one embodiment of the invention, the API schema type (306) may be a reference to a specific schema (i.e., format) for instantiating the one or more APIs through which interfacing with a hardware device may be achieved; and through which one or more device operations, pertinent to the hardware device, may be executed. Further, the schema may specify information (e.g., metadata) that describes: (i) the structure through which data pertaining to the one or more APIs may be represented; and (ii) the protocol through which to properly interact with the one or more APIs. By way of an example, the API schema type (306) may reference the OpenAPI schema, which provides structure for computer readable interface files for describing, producing, consuming, and visualizing representational state transfer (REST)ful web services.

In one embodiment of the invention, the profile ID (308) may be a string of characters (e.g., letters, numbers, symbols, etc.) that may be used to uniquely identify the SCP (300). The profile ID (308) may be generated during or upon completion of the service container installation and/or registration process performed by the CDA. By way of an example, the profile ID (308) may be an alphanumeric tag, or may be a N-bit integer (where N>0) expressed in hexadecimal notation.

In one embodiment of the invention, the device type (310) may be a reference to a group of related hardware devices. The hardware devices may be related, for example, by purpose, by manufacturer, by classification, by size, by feature, or by any other factor. In one embodiment of the invention, the device type (310) may be a product line ID that references a particular hardware device product line. Subsequently, by way of an example, the device type (310) may be expressed as a string of characters (e.g., letters, numbers, symbols, etc.) that may be used to uniquely reference a family of hardware devices.

In one embodiment of the invention, the operations list (312) may encompass a set of one or more references directed to device operations respective to the hardware device. Each device operation reference may take the form of a string of characters (e.g., letters, numbers, symbols, etc.), which may reference a device operation that the hardware device may perform. Further, the operations list (312) may represent at least a subset of the various device operations supported by the management and orchestration platform (MOP). Examples of device operations supported by the MOP include, but are not limited to including: discovering, querying, configuring, inventorying, templating, monitoring, and alerting.

In one embodiment of the invention, DAI (314) may entail information pertinent to interfacing with a hardware device. That is, the DAI (314) may specify information necessary for establishing, as well as terminating, a connection with the hardware device. Accordingly, the DAI (314) may include a device connection API schema (316) and a device disconnection API schema (318). Each of these components is described below.

In one embodiment of the invention, the device connection API schema (316) may refer to a data container (e.g., a data structure, a document, a table, etc.) that outlines various properties defining a device connection API instance (or request). The properties specified in the device connection API schema (316) may include, but are not limited to including: (i) a uniform resource locator (URL) referencing the service container with which the SCP (300) may be associated; (ii) a request method supported by, for example, the hypertext transfer protocol (HTTP), that indicates the desired action to be performed on the resource (i.e., service container) referenced by the URL; (iii) one or more parameters that permits the passing of additional information pertaining to the request; and (iv) a response handling schema that outlines instructions for handling session tokens and/or error exceptions that may result from the instantiation of the device connection API instance or request. Further, the device connection API schema (316) may follow the structure defined by the API schema type (306) specified in the CRI (302).

In one embodiment of the invention, the device disconnection API schema (318) may refer to a data container (e.g., a data structure, a document, a table, etc.) that outlines various properties defining a device disconnection API instance (or request). The properties specified in the device disconnection API schema (318) may include, but are not limited to including: (i) a URL referencing the service container with which the SCP (300) may be associated; and (ii) a request method supported by, for example, the HTTP, that indicates the desired action to be performed on the resource (i.e., service container) referenced by the URL. Further, the device disconnection API schema (318) may follow the structure defined by the API schema type (306) specified in the CRI (302).

In one embodiment of the invention, DOI (320) may entail information pertinent to the execution of device operations that a hardware device may include functionality to perform. That is, DOI (320) may specify information necessary for invoking the one or more device operations respective to the hardware device. Accordingly, the DOI (320) may include one or more device operation API schemas (322A-322N).

In one embodiment of the invention, a device operation API schema (322A-322N) may refer to a data container (e.g., a data structure, a document, a table, etc.) that outlines various properties defining a device operation API instance (or request). The properties specified in the device operation API schema (322A-322N) may include, but are not limited to including: (i) a device operation reference identifying or labeling the device operation API schema (322A-322N) (ii) a URL referencing instructions for instantiating a container for executing the device operation; (iii) a request method supported by, for example, the HTTP, that indicates the desired action to be performed on the resource (i.e., container instantiation instructions) referenced by the URL; (iv) one or more parameters that permits the passing of additional information pertaining to the request; and (v) a response handling schema that outlines instructions for handling session tokens and/or error exceptions that may result from the instantiation of the device operation API instance or request. Further, each device operation schema (322A-322N) may follow the structure defined by the API schema type (306) specified in the CRI (302). Moreover, each device operation schema (322A-322N) may map to one of the device operation references specified in the operations list (312).

Figure 4:
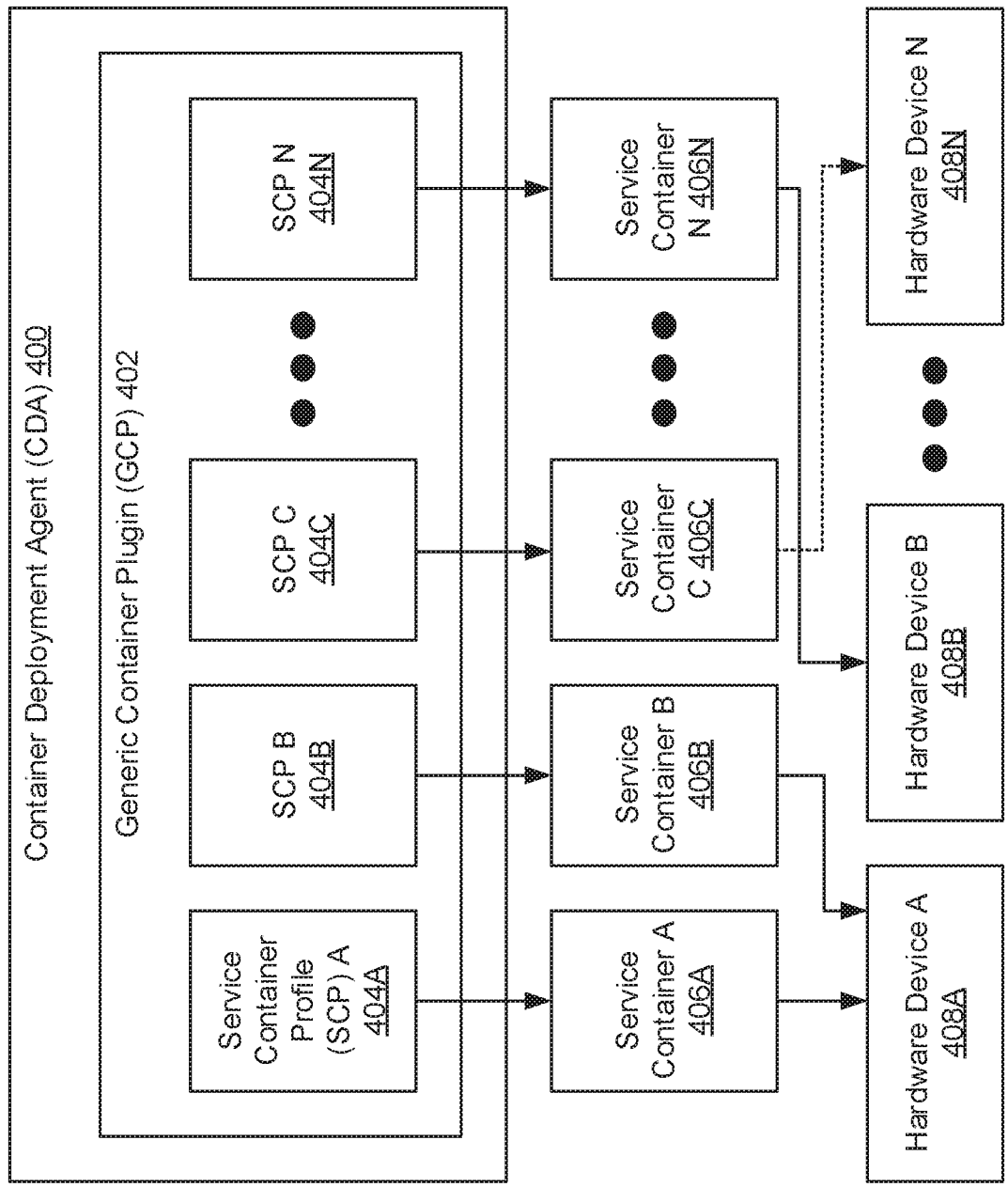
FIG. 4 shows a container deployment agent in accordance with one or more embodiments of the invention.

FIG. 4 shows a container deployment agent (CDA) in accordance with one or more embodiments of the invention. As described above, the CDA (400) may be a computer program or process tasked with the deployment and execution of service containers (406A-406N) onto the MOP (see e.g., FIG. 1). Specifically, the CDA (400) may include functionality to implement a generic container plugin (GCP) (402). The GCP (402) may be a tool and/or service that grants, to a platform (e.g., the MOP), the functionality of seamlessly integrating custom, third-party tools and/or services (i.e., service containers) into the basic framework of the platform. That is, traditionally, custom, third-party tools and/or services may be defined or expressed using different technological stacks, programming languages, libraries, etc., which tend to complicate their integration into platforms. Accordingly, the GCP (402) alleviates this difficulty by enabling these custom, third-party tools and/or services to manifest as secured, sandboxed computer processes through the use of containers, which are stateless and fail to cause idling in computer processor and/or memory usage.

In one embodiment of the invention, the GCP (402) may include functionality to process service container registrations, where a service container (406A-406N) may embody a custom, third-party tool and/or service. To that effect, the GCP (402) may, at least in part, include or reference the container registry (not shown) (see e.g., FIG. 3), which may store the various service container profiles (SCPs) (404A-404N) that pertain to the various service containers (406A-406N) that have been integrated, or are in the process of being integrated, into the platform (e.g., MOP). In general, each SCP (404A-404N) specifies information pertinent to a service container (406A-406N)—details of which are described above with respect to FIGS. 2 and 3. The aforementioned pertinent information may enable the CDA (400), through the GCP (402), to interact or otherwise call forth the respective service container (406A-406N). Further, upon instantiation and execution of the respective service container (406A-406N), one or more device operations (not shown) defined in the respective SCP (404A-404N), and implemented in the respective service container (406A-406N), may be invoked to effect an added (or augmented) feature or functionality of a hardware device (408A-408N).

Figure 5:
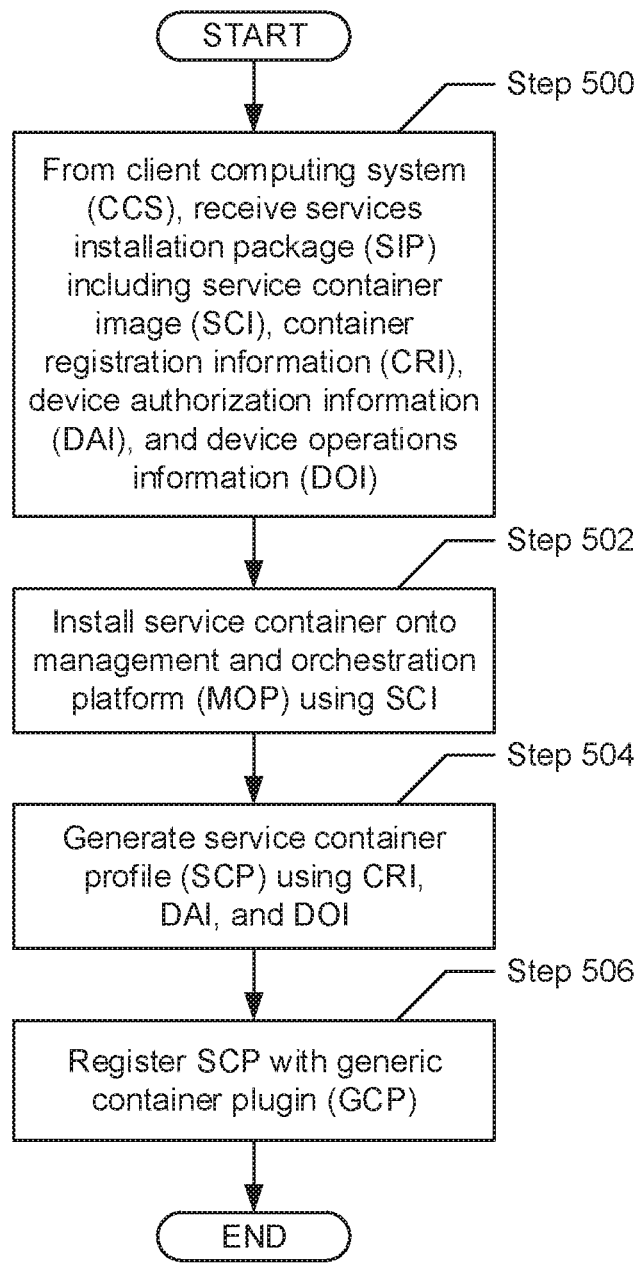
FIG. 5 shows a flowchart describing a method for registering a service container in accordance with one or more embodiments of the invention.

FIG. 5 shows a flowchart describing a method for registering a service container in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 5 may be performed in parallel with any other steps shown in FIGS. 6A-6C without departing from the scope of the invention.

Turning to FIG. 5, in Step 500, a services installation package (SIP) is received. Specifically, the SIP may be received from (or uploaded by) a client computing system (CCS) (see e.g., FIG. 1). Further, in one embodiment of the invention, the SIP may pertain to providing a custom, third-party tool and/or service that may extend the standard behavior or functionality of a hardware device. The SIP may be a data container (e.g., a compressed file, an image-based snapshot, a library, etc.) that may include a service container image (SCI), container registration information (CRI), device authorization information (DAI), and device operations information (DOI).

In one embodiment of the invention, the SCI may be an image-based snapshot of a service container. As previously described, a service container may be an isolated, lightweight virtualization mechanism (or software construct) that allows for the execution of a custom, third-party tool and/or service via secured and sandboxed computer processes. Said another way, the SCI may be an exact copy of computer software (e.g., computer programs or processes (i.e., instances of computer programs)) and/or computer firmware (e.g., device drivers) directed to adding new features and functionalities to, or augmenting existing features and functionalities of, a targeted hardware device. The SCI may further include any settings, libraries, computer readable program code, etc., necessary to enact and support execution of the aforementioned custom, third-party tool and/or service. Details describing CRI, DAI, and DOI are discussed above with respect to FIG. 3.

In Step 502, a service container (described above) is installed. Specifically, in one embodiment of the invention, the service container may be installed using at least the SCI (obtained in Step 500). More specifically, the SCI may be restored, thereby obtaining the service container. Restoration of the SCI may entail allocating computing resources (e.g., computer processors, memory, storage, etc.) to instantiate the computer programs or processes that embody the service container (i.e., the custom, third-party tool and/or service). The computing resources may be provided by the underlying hardware of a management and orchestration platform (MOP) (see e.g., FIG. 1) to which the SIP (in Step 500) had been uploaded.

In Step 504, a service container profile (SCP) is generated. In one embodiment of the invention, the SCP may be a collection of information pertaining to the service container (obtained/installed in Step 502). Specifically, the SCP may specify information pertinent to service container registration (see e.g., Step 506), as well as hardware device interfacing and operation (see e.g., FIGS. 6A and 6B). Subsequently, the SCP may be generated using the CRI, the DAI, and/or the DOI (received in Step 500). Generation of the SCP may entail aggregating and encoding the CRI, DAI, and DOI within a data container (e.g., a data structure, a table, a text file, etc.). Further details describing the SCP is discussed above with respect to FIGS. 2 and 3.

In Step 506, the SCP (generated in Step 504) is registered. Specifically, in one embodiment of the invention, the SCP is registered with a generic container plugin (GCP). As described above, the GCP may be a tool and/or service that grants, to a platform (e.g., the MOP), the functionality of seamlessly integrating custom, third-party tools and/or services (i.e., service containers) into the basic framework of the platform. Further, registration of the SCP may entail storing the SCP in a container registry (see e.g., FIG. 2), which the GCP, at least in part, includes or references.

Figure 6A:
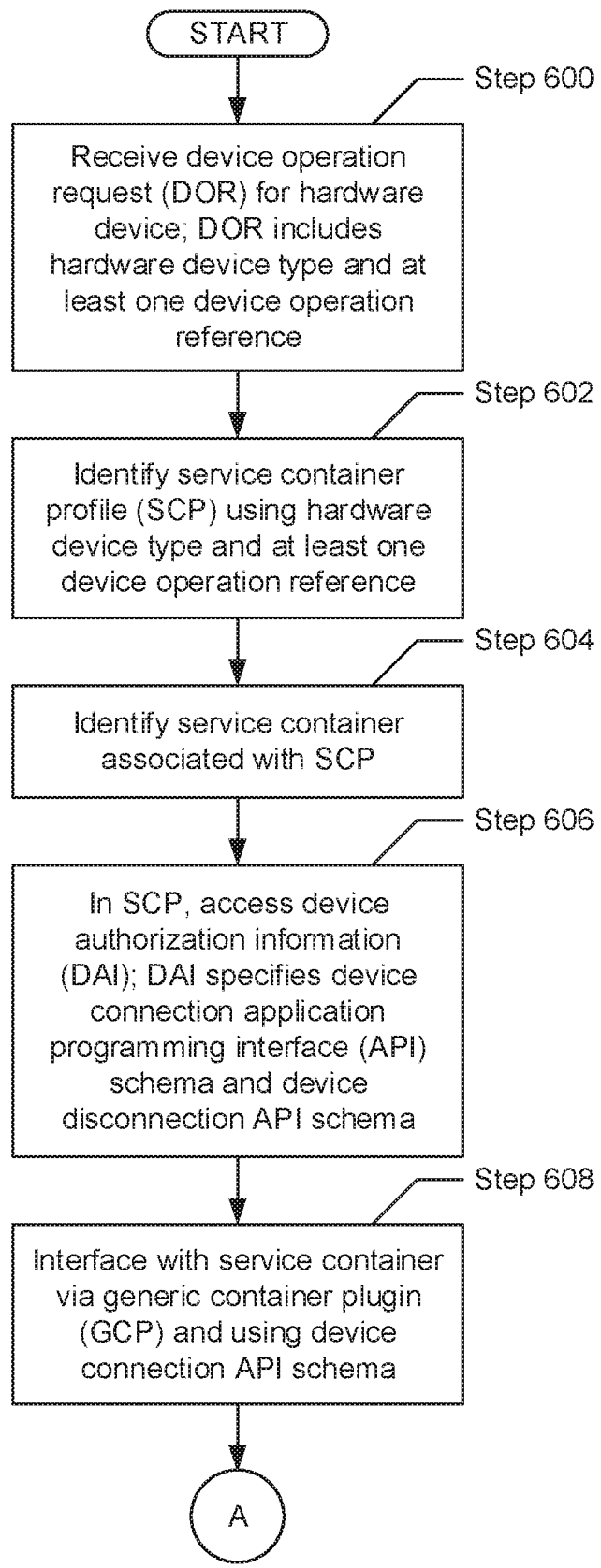
FIGS. 6A-6C show flowcharts describing a method for processing a device operation request in accordance with one or more embodiments of the invention.
Figure 6B:
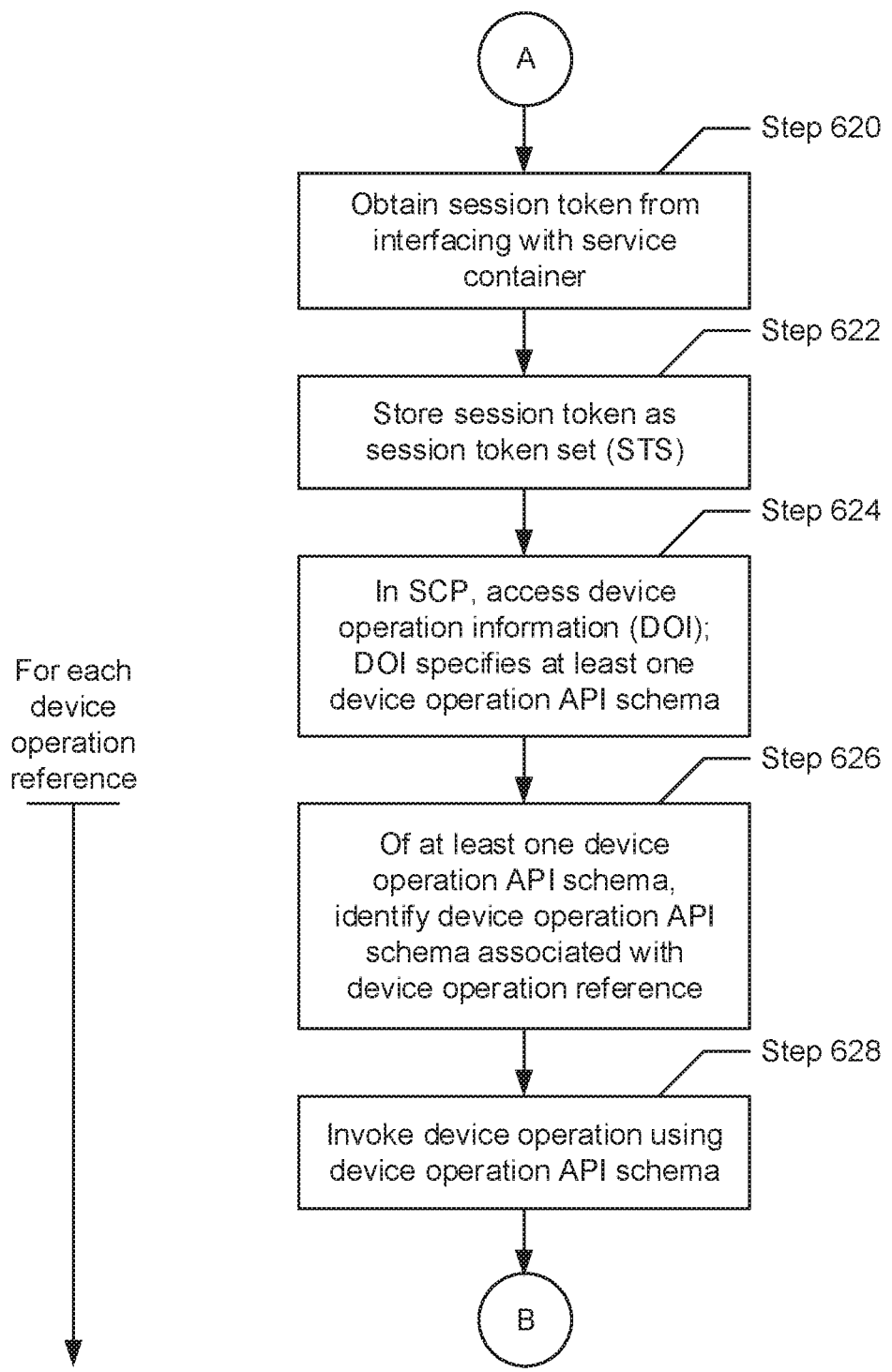
Figure 6C:
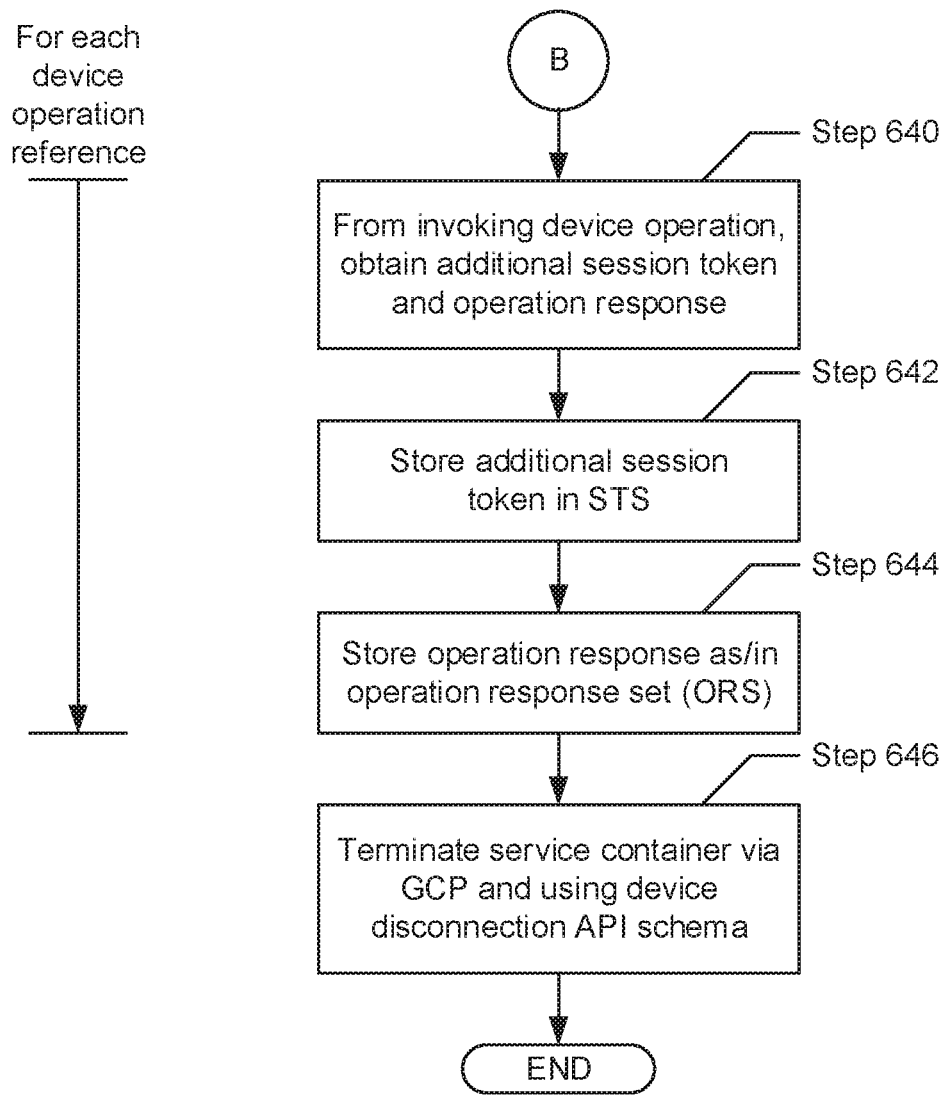

FIGS. 6A-6C show flowcharts describing a method for processing a device operation request in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 6A-6C may be performed in parallel with any other steps shown in FIG. 5 without departing from the scope of the invention.

Turning to FIG. 6A, in Step 600, a device operation request (DOR) is received by a management and orchestration platform (MOP). Specifically, the DOR may have been received from (or submitted by) a client computing system (CCS), or alternatively, a client computer program or process executing on the MOP. The DOR may pertain to executing one or more device operations respective to a hardware device managed by, residing on, or otherwise operatively connected to the MOP. Further, the DOR may include a hardware device type and at least one device operation reference. Details describing the hardware device type and the device operation reference(s) are discussed above with respect to FIG. 3.

In Step 602, a service container profile (SCP) is identified. In one embodiment of the invention, a SCP may be a collection of information pertaining to a service container (i.e., a custom, third-party tool and/or service directed to the hardware device). Identification of the SCP may entail isolating the appropriate SCP, of various stored SCPs, that specifies both the hardware device type and device operation reference(s) (obtained in Step 600).

In Step 604, a service container is identified. Specifically, in one embodiment of the invention, the SCP (identified in Step 602) may be used to identify the service container. More specifically, identification of the service container may entail: (i) accessing the container registration information (CRI) specified in the SCP; (ii) obtaining a container identifier (ID) specified in the CRI; (iii) accessing a container store (see e.g., FIG. 2); and (iv) retrieving, from the container store, the service container referenced by the container ID.

In Step 606, device authorization information (DAI) specified in the SCP (identified in Step 602) is accessed. In one embodiment of the invention, DAI may entail information pertinent to interfacing with a hardware device. Specifically, as described above (see e.g., FIG. 3), the DAI may specify a device connection application programming interface (API) schema and a device disconnection API schema. Both these schema may subsequently be retrieved.

In Step 608, an interface with the service container (identified in Step 604) is established. Specifically, in one embodiment of the invention, the interface may be established through a generic container plugin (GCP) and using the device connection API schema (obtained in Step 606). As described above, the GCP may be a tool and/or service that grants, to a platform (e.g., the MOP), the functionality of seamlessly integrating custom, third-party tools and/or services (i.e., service containers) into the basic framework of the platform. The device connection API schema, on the other hand, may refer to a data container (e.g., a data structure, a document, a table, etc.) that outlines various properties defining a device connection API instance (or request). Further, in using some or all of these properties, a device connection API (between the GCP and the service container) may be instantiated to allow interactivity with the service container.

Turning to FIG. 6B, in Step 620, a session token is obtained. In one embodiment of the invention, the session token may be a unique identifier that references the API session instantiated through interfacing with the service container (performed in Step 608). Thereafter, in Step 622, the session token (obtained in Step 620) is used to generate and store a session token set (STS). The STS may be stored in a session store (see e.g., FIG. 2).

In Step 624, device operations information (DOI) specified in the SCP (identified in Step 602) is accessed. In one embodiment of the invention, the DOI may entail information pertinent to executing device operations respective to the hardware device. Further, the DOI may specify at least one device operation API schema, details of which are discussed above with respect to FIG. 3.

In Step 626, for each device operation reference (obtained in Step 600), a corresponding device operation API schema is identified. In one embodiment of the invention, each device operation API schema, in general, may refer to a data container (e.g., a data structure, a document, a table, etc.) that outlines various properties defining a device operation API instance (or request). Further, identification of the appropriate device operation API schema may entail isolating the device operation API schema, of the at least one device operation API schemas specified in the DOI, by matching the device operation reference to a label associated with the appropriate device operation API schema.

In Step 628, for each device operation API schema (identified in Step 626), the corresponding device operation is invoked. Specifically, in one embodiment of the invention, some or all information specified in a device operation API schema may be used to invoke the corresponding device operation. Invocation of the device operation may entail generating a hypertext transfer protocol (HTTP) request, defined in the device operation API schema, to elicit an action to be performed on a resource (referenced by a uniform resource locator (URL) specified in the device operation API schema). The resource may encompass computer instructions for instantiating a container for executing the device operation that corresponds to the device operation API schema.

Turning to FIG. 6C, in Step 640, from each device operation (invoked in Step 628), an additional session token and an operation response are obtained. In one embodiment of the invention, the additional session token may be a unique identifier that references the API session instantiated through the invocation of the device operation. On the other hand, the operation response may represent the result attained from the invocation of a device operation. In one embodiment of the invention, the result may express the successful invocation (e.g., a success message) of the device operation. In another embodiment of the invention, the result may alternatively express the failure (e.g., an error message) of the device operation invocation.

In Step 642, each additional session token (obtained in Step 640) is stored. Specifically, like the session token (obtained in Step 620), the additional session token(s) may be stored in the session store (see e.g., FIG. 2). In Step 644, each operation response (also obtained in Step 640) is stored as/in an operation response set (ORS). More specifically, in one embodiment of the invention, a first operation response corresponding to a first device operation invocation may be used to generate the ORS. Thereafter, any subsequent operation responses, if any, corresponding to any subsequent device operation invocations, may be stored in the generated ORS.

In Step 646, after storing the operation response(s), the service container (identified in Step 604) is terminated. In one embodiment of the invention, termination of the service container may be achieved using the device disconnection API schema (obtained in Step 606). The device disconnection API schema may refer to a data container (e.g., a data structure, a document, a table, etc.) that outlines various properties defining a device disconnection API instance (or request). Further, termination of the service container may entail using some or all properties specified in the device disconnection API schema to terminate the API session previously established (between the GCP and the service container), as well as to deallocate any computing resources (e.g., computer processors, memory, storage, etc.) used to support the instantiation and execution of the service container.

Figure 7:
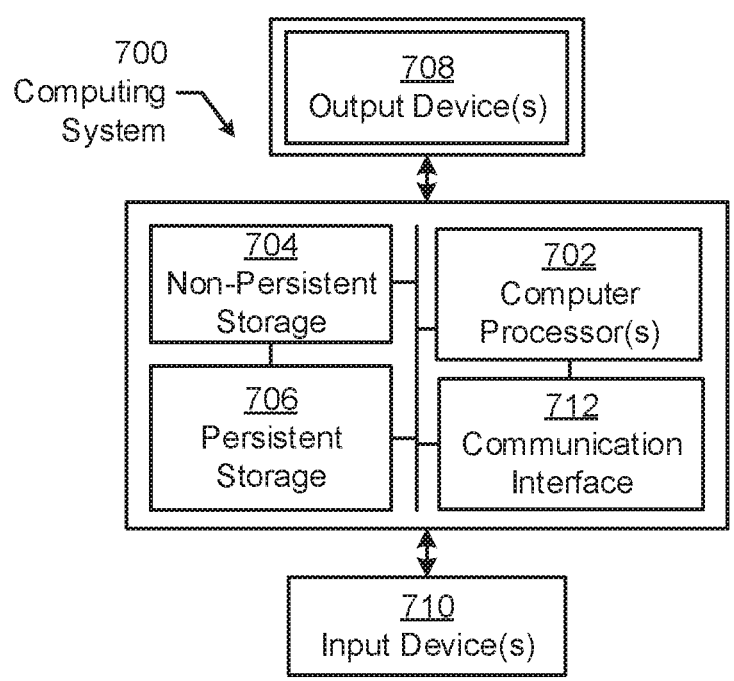
FIG. 7 shows a computing system in accordance with one or more embodiments of the invention.

FIG. 7 shows a computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device. Further, the communication interface (712) may include an integrated circuit for connecting the computing system (900) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIG. 8A shows an example of container registration information (CRI) in accordance with one or more embodiments of the invention. FIG. 8B shows an example of device authorization information (DAI) in accordance with one or more embodiments of the invention. FIG. 8C shows an example of device operations information (DOI) in accordance with one or more embodiments of the invention. Further, in one embodiment of the invention, each of the examples portrayed in FIGS. 8A-8C may be aggregated to represent an example service container profile (SCP) (see e.g., FIG. 3). Moreover, each of the examples portrayed in FIGS. 8A-8C are expressed using the JavaScript Object Notation (JSON) schema, however, one of ordinary skill will appreciate that the CRI, the DAI, and the DOI may be expressed in any other schema and/or programming language without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deploying a third-party device service for a hardware device managed by a platform, comprising:
    receiving, for the third-party device service, a services installation package (SIP) comprising a service container image (SCI), container registration information (CRI), device authorization information (DAI), and device operations information (DOI);
    installing a service container onto the platform using the SCI;
    generating, for the service container, a service container profile (SCP) using the CRI, the DAI, and the DOI;
    registering the SCP with a generic container plugin (GCP) implemented on the platform; and
    following a registration of the SCP:
        executing the third-party device service on the hardware device using the service container, the SCP, and the GCP,
        wherein executing the third-party device service on the hardware device using the service container, the SCP, and the GCP, comprises:
            receiving, for the hardware device, a device operation request (DOR) comprising a device type and at least one device operation reference;
            identifying the SCP using the device type and the at least one device operation reference;
            accessing, as specified in the SCP, the DAI to obtain a device connection application programming interface (API) schema and a device disconnection API schema;
            interfacing with the service container through the GCP and using the device connection API schema;
            for each device operation reference of the at least one device operation reference:
                accessing, as specified in the SCP, the DOI to identify a device operation API schema associated with the device operation reference; and
                invoking a device operation of the hardware device using the device operation API schema.

2. The method of claim 1, wherein:
    the SCI is an image-based snapshot of the service container,
    the service container is obtained upon restoration of the SCI, and
    the restoration of the SCI comprises allocating computing resources for the service container.

3. The method of claim 1, wherein the CRI comprises a container identifier (ID) referencing the service container, an application programming interface (API) schema type specifying an API schema, a profile ID referencing the SCP, a device type referencing a product line to which the hardware device belongs, and an operations list comprising at least one device operation reference.

4. The method of claim 3, wherein the API schema pertains to a representational state transfer (REST)ful API.

5. The method of claim 3, wherein the at least one device operation reference identifies at least one device operation performable by the hardware device, wherein the at least one device operation is a subset of all device operations for a plurality of hardware devices supported by the platform.

6. The method of claim 1, wherein the DAI comprises a device connection application programming interface (API) schema and a device disconnection API schema, wherein the device connection API schema specifies a first set of properties required for connecting to the hardware device, wherein the device disconnection API schema specifies a second set of properties required for disconnecting from the hardware device.

7. The method of claim 1, wherein the DOI comprises at least one device operation application programming interface (API) schema for at least one device operation performable by the hardware device, wherein the at least one device operation API schema specifies a set of properties required for invoking the at least one device operation.

8. The method of claim 1, wherein the platform is a management and orchestration platform (MOP).

9. The method of claim 1, wherein the GCP references to a container registry, wherein registering the SCP with the GCP comprises at least storing the SCP in the container registry.

10. The method of claim 1, further comprising:
    for each device operation reference of the at least one device operation reference:
        obtaining, from the invoking, an operation response; and
    after the operation response is obtained for each device operation reference:
        terminating the service container through the GCP and using the device disconnection API schema.

11. A system for deploying a third-party device service for a hardware device managed by a platform, comprising:
    a client computing system (CCS), wherein the CCS is executed on hardware; and
    a platform operatively connected to the CCS, and comprising a container deployment agent (CDA) programmed to:
        receive, from the CCS, a services installation package (SIP) comprising a service container image (SCI), container registration information (CRI), device authorization information (DAI), and device operations information (DOI);
        install a service container onto the platform using the SCI;
        generate, for the service container, a service container profile (SCP) using the CRI, the DAI, and the DOI;
        register the SCP with a generic container plugin (GCP) implemented on the platform; and
        following a registration of the SCP:
            execute the third-party device service on the hardware device using the service container, the SCP, and the GCP,
            wherein executing the third-party device service on the hardware device using the service container, the SCP, and the GCP, comprises:

receiving, for the hardware device, a device operation request (DOR) comprising a device type and at least one device operation reference;

identifying the SCP using the device type and the at least one device operation reference;

accessing, as specified in the SCP, the DAI to obtain a device connection application programming interface (API) schema and a device disconnection API schema;

interfacing with the service container through the GCP and using the device connection API schema;

for each device operation reference of the at least one device operation reference:
    accessing, as specified in the SCP, the DOI to identify a device operation API schema associated with the device operation reference; and
    invoking a device operation of the hardware device using the device operation API schema.

12. The system of claim 11, wherein the platform further comprises a plurality of hardware devices, wherein the service container deploys a third-party device service for one hardware device of the plurality of hardware devices.

13. The system of claim 11, wherein the platform further comprises a data repository, wherein the data repository comprises a container store for storing at least the service container and a container registry for storing at least the SCP.

14. The system of claim 11, wherein the platform is a management and orchestration platform (MOP).

15. A non-transitory computer readable medium (CRM) comprising computer readable program code, which when executed by a computer processor, enables the computer processor to:

receive, pertaining to a third-party device service for a hardware device, a services installation package (SIP) comprising a service container image (SCI), container registration information (CRI), device authorization information (DAI), and device operations information (DOI);

install, using the SCI, a service container onto a platform whereon the computer processor resides;

generate, for the service container, a service container profile (SCP) using the CRI, the DAI, and the DOI;

register the SCP with a generic container plugin (GCP) implemented on the platform; and following a registration of the SCP:
    execute the third-party device service on the hardware device using the service container, the SCP, and the GCP, wherein executing the third-party device service on the hardware device using the service container, the SCP, and the GCP, comprises:
    receiving, for the hardware device, a device operation request (DOR) comprising a device type and at least one device operation reference;
    identifying the SCP using the device type and the at least one device operation reference;
    accessing, as specified in the SCP, the DAI to obtain a device connection application programming interface (API) schema and a device disconnection API schema;
    interfacing with the service container through the GCP and using the device connection API schema;
    for each device operation reference of the at least one device operation reference:
        accessing, as specified in the SCP, the DOI to identify a device operation API schema associated with the device operation reference; and
        invoking a device operation of the hardware device using the device operation API schema.

16. The non-transitory CRM of claim 15, wherein the hardware device is managed by the platform.

17. The non-transitory CRM of claim 15, wherein the device connection API schema, the device disconnection API schema, and each device operation API schema for the at least one device operation reference employ a same API schema type, wherein the same API schema type is specified in the CRI.

18. The non-transitory CRM of claim 15, further comprising computer readable program code, which when executed by the computer processor, enables the computer processor to:

for each device operation reference of the at least one device operation reference:
    obtain, from invoking the device operation, an operation response; and after the operation response is obtained for each device operation reference:
    terminate the service container through the GCP and using the device disconnection API schema.

\* \* \* \* \*